US009367474B2

United States Patent
Desai et al.

(10) Patent No.: US 9,367,474 B2
(45) Date of Patent: Jun. 14, 2016

(54) TRANSLATING CACHE HINTS

(71) Applicant: Apple Inc., Cupertino, CA (US)

(72) Inventors: Shailendra S. Desai, San Jose, CA (US);
Gurjeet S. Saund, Saratoga, CA (US);
Deniz Balkan, Santa Clara, CA (US);
James Wang, Vista, CA (US)

(73) Assignee: Apple Inc., Cupertino, CA (US)

( * ) Notice: Subject to any disclaimer, the term of this patent is extended or adjusted under 35 U.S.C. 154(b) by 171 days.

(21) Appl. No.: 13/915,911

(22) Filed: Jun. 12, 2013

(65) Prior Publication Data

US 2014/0372699 A1 Dec. 18, 2014

(51) Int. Cl.
*G06F 12/0893* (2016.01)
*G06F 12/08* (2016.01)
*G06F 12/12* (2016.01)

(52) U.S. Cl.
CPC ........ *G06F 12/0893* (2013.01); *G06F 12/0802* (2013.01); *G06F 12/0888* (2013.01); *G06F 12/12* (2013.01); *Y02B 60/1225* (2013.01)

(58) Field of Classification Search
None
See application file for complete search history.

(56) References Cited

U.S. PATENT DOCUMENTS

| | | | |
|---|---|---|---|
| 7,181,516 B2 | 2/2007 | Kaneda et al. | |
| 7,213,082 B2 | 5/2007 | Jeddeloh | |
| 7,761,664 B2 | 7/2010 | Gill | |
| 8,266,382 B1 | 9/2012 | Minkin et al. | |
| 2013/0191600 A1* | 7/2013 | Kuesel et al. | 711/136 |
| 2014/0201463 A1* | 7/2014 | Blankenship et al. | 711/143 |
| 2014/0281131 A1* | 9/2014 | Joshi et al. | 711/103 |

* cited by examiner

*Primary Examiner* — Sean D Rossiter
*Assistant Examiner* — Charles Choi
(74) *Attorney, Agent, or Firm* — Rory D. Rankin; Meyertons, Hood, Kivlin, Kowert & Goetzel, P.C.

(57) ABSTRACT

Systems and methods for translating cache hints between different protocols within a SoC. A requesting agent within the SoC generates a first cache hint for a transaction, and the first cache hint is compliant with a first protocol. The first cache hint can be set to a reserved encoding value as defined by the first protocol. Prior to the transaction being sent to the memory subsystem, the first cache hint is translated into a second cache hint. The memory subsystem recognizes cache hints which are compliant with a second protocol, and the second cache hint is compliant with the second protocol.

17 Claims, 9 Drawing Sheets

140

| First Cache Hint Encoding | | | | Outer Cacheability Interpretation in SoC | Encoding Generated by Other Processor | Read Transaction | Write Transaction |
|---|---|---|---|---|---|---|---|
| [3] | [2] | [1] | [0] | | | [2:0] Memory Cache Allocation | [2:0] Memory Cache Allocation |
| 0 | 0 | 0 | 0 | Bypass | Yes | Do not Allocate | Do not Allocate |
| 0 | 0 | 0 | 1 | Bypass | Yes | Do not Allocate | Do not Allocate |
| 0 | 0 | 1 | 0 | Do not Allocate | No | Do not Allocate | Do not Allocate |
| 0 | 0 | 1 | 1 | Bypass | Yes | Do not Allocate | Do not Allocate |
| 0 | 1 | 0 | 0 | De-allocate Reads | No | De-allocate on Hit | Do not Allocate |
| 0 | 1 | 0 | 1 | Allocate Sticky for Reads | No | Allocate Sticky | Do not Allocate |
| 0 | 1 | 1 | 0 | WT+RA | Yes | Allocate Normal | Do not Allocate |
| 0 | 1 | 1 | 1 | WB+RA | Yes | Allocate Normal | Do not Allocate |
| 1 | 0 | 0 | 0 | De-allocate Writes | No | Do not Allocate | De-allocate on Hit |
| 1 | 0 | 0 | 1 | Allocate Sticky for Writes | No | Do not Allocate | Allocate Sticky |
| 1 | 0 | 1 | 0 | Allocate Writes | No | Do not Allocate | Allocate Normal |
| 1 | 0 | 1 | 1 | Allocate Writes | No | Do not Allocate | Allocate Normal |
| 1 | 1 | 0 | 0 | De-allocate | No | De-allocate on Hit | De-allocate on Hit |
| 1 | 1 | 0 | 1 | Allocate Sticky | No | Allocate Sticky | Allocate Sticky |
| 1 | 1 | 1 | 0 | Allocate | No | Allocate Normal | Allocate Normal |
| 1 | 1 | 1 | 1 | WB+WA+RA | Yes | Allocate Normal | Allocate Normal |

FIG. 3

Cache Hint Table
150

| Attribute | Value |
|---|---|
| No Hint | 000 |
| Allocate Normal | 001 |
| Allocate Sticky | 010 |
| Do Not Allocate | 011 |
| De-Allocate (Set LRU) | 100 |
| Reserved | 101-111 |

| Reserved? | First Cache Hint Encoding | | | | Other Attribute(s) (RID, DID, R/W, etc.) | | Second Cache Hint Encoding | | | | | |
|---|---|---|---|---|---|---|---|---|---|---|---|---|
| | | | | | | | Read Transaction | | | Write Transaction | | |
| | 0 | 0 | 0 | 0 | | Maps To | X | X | X | X | X | X |
| | 0 | 0 | 0 | 1 | | | X | X | X | X | X | X |
| | 0 | 0 | 1 | 0 | | | X | X | X | X | X | X |
| | 0 | 0 | 1 | 1 | | | X | X | X | X | X | X |
| | 0 | 1 | 0 | 0 | | | X | X | X | X | X | X |
| | 0 | 1 | 0 | 1 | | | X | X | X | X | X | X |
| | 0 | 1 | 1 | 0 | | | X | X | X | X | X | X |
| | 0 | 1 | 1 | 1 | | | X | X | X | X | X | X |
| | 1 | 0 | 0 | 0 | | | X | X | X | X | X | X |
| | 1 | 0 | 0 | 1 | | | X | X | X | X | X | X |
| | 1 | 0 | 1 | 0 | | | X | X | X | X | X | X |
| | 1 | 0 | 1 | 1 | | | X | X | X | X | X | X |
| Reserved | 1 | 1 | 0 | 0 | | | X | X | X | X | X | X |
| Reserved | 1 | 1 | 0 | 1 | | | X | X | X | X | X | X |
| Reserved | 1 | 1 | 1 | 0 | | | X | X | X | X | X | X |
| Reserved | 1 | 1 | 1 | 1 | | | X | X | X | X | X | X |

*FIG. 6*

TRANSLATING CACHE HINTS

BACKGROUND

1. Field of the Invention

The present invention relates generally to the field of computer systems, and in particular to methods and mechanisms for utilizing cache hints.

2. Description of the Related Art

As memory requests move through a system on chip (SoC) fabric, a cache hint mechanism may be implemented such that an agent generating a memory request may also provide information representing the cacheability information associated with that request. However, a SoC may include multiple different domains with different protocols, and cache hints generated in one domain may not be properly recognized or acted upon in other domains.

In these scenarios, with a SoC that has multiple protocols that are used by its various components, the problem of communicating and sharing cacheability information across components is encountered. Therefore, it can be challenging to convey the appropriate cache hint information from a legacy component that is compliant with a first protocol to a memory subsystem that is compliant with a second protocol.

SUMMARY

Systems and methods for sharing cacheability information across domains are contemplated.

In one embodiment, a system on chip (SoC) may include multiple components, and there may be multiple different domains within the SoC and one or more components or logical units within each domain. Various techniques for communicating cacheability information between separate domains may be utilized. For example, when a first component in a first domain is communicating with a second component in a second domain, a bridge unit may be utilized to facilitate communication between the first and second domains.

Transactions may be generated by the first component, and cache hints may be generated for these transactions. The cache hint may be used to specify how an external cache should treat the corresponding transaction. The external cache may have additional capabilities that are not supported or fully mapped from the cache hint encodings that are available to the first component. For example, in one embodiment, the external cache may have the capability to perform a sticky allocation, and the cache hint encoding values available to a given requesting agent may not be able to specify a sticky allocation in a way that is recognizable by the external cache. Also, in some embodiments, the external cache may recognize a de-allocate cache hint, but a given requesting agent may not be able to specify this de-allocate cache hint.

In one embodiment, a first domain of the SoC may utilize a first bus protocol to communicate with other components on the SoC fabric. The first bus protocol may be a proprietary communication protocol or it may be an industry-standard communication protocol, such as ARM Advanced Extensible Interface (AXI™), Peripheral Component Interconnect Express (PCIe®), ARM Advance Peripheral Bus (APB™), ARM Advanced High Performance Bus (AHB™), or the like. The memory subsystem may utilize a protocol which is not compatible with the first bus protocol. In one embodiment, the memory subsystem may utilize a proprietary protocol, while in other embodiments, the memory subsystem may utilize any of various industry standard protocols. A bridge unit may translate the cache hint encodings of transactions that are being conveyed from the first domain to the memory subsystem. The original cache hint encodings from the first bus protocol may be translated into new cache hint encodings that are compatible with the second bus protocol utilized by the memory subsystem. In some embodiments, the first domain may include an additional logic unit which generates cache hint encodings which utilize reserved encodings as defined by the first bus protocol.

In one embodiment, the existing first bus and infrastructure may be utilized to transmit cache hint encodings which can then be translated by the bridge unit into cache hints compatible with the protocol used by the memory subsystem. In some embodiments, a third domain may utilize cache hints compliant with a third protocol to communicate with the SoC bus and with the memory subsystem. This third protocol may be translated by a second bridge unit into cache hints compatible with the protocol utilized by the memory subsystem.

In some embodiments, cache hints may be translated based on other attributes of a transaction. For example, the agent ID of the transaction, the types of the transaction (read or write), the stream of the transaction, address range, or other attributes of the transaction may be used to perform the translation and/or generation of the cache hint associated with the transaction.

Also, in some embodiments, a programmable override function may be implemented within a bridge unit used to facilitate communication between different domains. The override function may generate a new cache hint for a received transaction and override the existing, original cache hint. In one embodiment, the override function may generate a cache hint based on whether a given transaction is a write transaction or a read transaction. In this embodiment, all read transactions may get a first cache hint, and all write transactions may get a second cache hint.

These and other features and advantages will become apparent to those of ordinary skill in the art in view of the following detailed descriptions of the approaches presented herein.

BRIEF DESCRIPTION OF THE DRAWINGS

The above and further advantages of the methods and mechanisms may be better understood by referring to the following description in conjunction with the accompanying drawings, in which:

FIG. 3 illustrates one embodiment of a cache hint translation table.

FIG. 4 illustrates one embodiment of a cache hint table for a memory cache.

FIG. 6 illustrates one embodiment of a table for mapping cache hints and other attributes from a first protocol to cache hints of a second protocol.

DETAILED DESCRIPTION OF EMBODIMENTS

Figure 1:
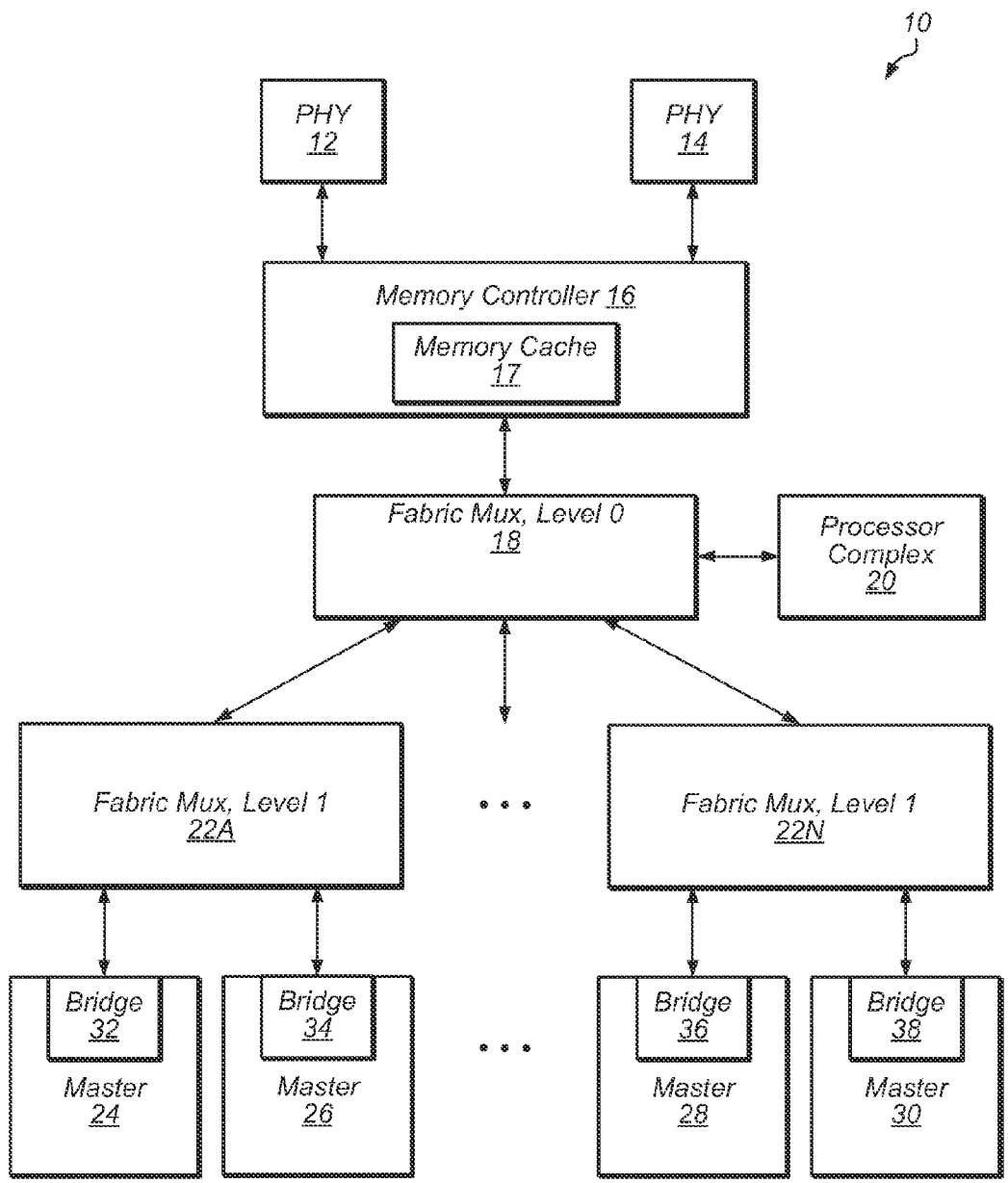
FIG. 1 is a block diagram that illustrates one embodiment of a portion of an IC.

In the following description, numerous specific details are set forth to provide a thorough understanding of the methods and mechanisms presented herein. However, one having ordinary skill in the art should recognize that the various embodiments may be practiced without these specific details. In some instances, well-known structures, components, signals, computer program instructions, and techniques have not been shown in detail to avoid obscuring the approaches described herein. It will be appreciated that for simplicity and clarity of illustration, elements shown in the figures have not necessarily been drawn to scale. For example, the dimensions of some of the elements may be exaggerated relative to other elements.

This specification includes references to "one embodiment". The appearance of the phrase "in one embodiment" in different contexts does not necessarily refer to the same embodiment. Particular features, structures, or characteristics may be combined in any suitable manner consistent with this disclosure. Furthermore, as used throughout this application, the word "may" is used in a permissive sense (i.e., meaning having the potential to), rather than the mandatory sense (i.e., meaning must). Similarly, the words "include", "including", and "includes" mean including, but not limited to.

Terminology. The following paragraphs provide definitions and/or context for terms found in this disclosure (including the appended claims):

"Comprising." This term is open-ended. As used in the appended claims, this term does not foreclose additional structure or steps. Consider a claim that recites: "A system comprising a first graphics unit . . . ." Such a claim does not foreclose the system from including additional components (e.g., a processor complex, a memory controller, etc.).

"Configured To." Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112, sixth paragraph, for that unit/circuit/component. Additionally, "configured to" can include generic structure (e.g., generic circuitry) that is manipulated by software and/or firmware (e.g., an FPGA or a general-purpose processor executing software) to operate in manner that is capable of performing the task(s) at issue. "Configured to" may also include adapting a manufacturing process (e.g., a semiconductor fabrication facility) to fabricate devices (e.g., integrated circuits) that are adapted to implement or perform one or more tasks.

"First," "Second," etc. As used herein, these terms are used as labels for nouns that they precede, and do not imply any type of ordering (e.g., spatial, temporal, logical, etc.). For example, in a memory controller having five ports, the terms "first" and "second" ports can be used to refer to any two of the five ports.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

Referring now to FIG. 1, a block diagram illustrating one embodiment of a portion of an integrated circuit (IC) is shown. In the illustrated embodiment, IC 10 includes processor complex 20, level 0 fabric mux 18, level 1 fabric muxes 22A-N, masters 24, 26, 28, and 30 (variously referred to as masters or bus masters), memory controller 16, and memory physical interface circuits (PHYs) 12 and 14. It is noted that IC 10 may also include many other components not shown in FIG. 1. In various embodiments, IC 10 may also be referred to as a system on chip (SoC), an application specific integrated circuit (ASIC), or an apparatus. Clock sources, such as phase lock loops (PLLs), and power sources are not shown for ease of illustration.

Components shown within IC 10 may be coupled to each other using any suitable bus and/or interface mechanism. In some embodiments, these components may be connected using ARM Holdings' Advanced Microcontroller Bus Architecture (AMBA®) protocol or any other suitable on-chip interconnect specification for the connection and management of logic blocks. Examples of AMBA® buses and/or interfaces may include Advanced eXtensible Interface (AXI), Advanced High-performance Bus (AHB), Advanced System Bus (ASB), Advanced Peripheral Bus (APB), Advanced Trace Bus (ATB), etc. Other types of bus and interface mechanisms, such as specialty or proprietary interfaces with custom protocols, may also be utilized to provide connections between any of the various components of IC 10.

Processor complex 20 may include any number of central processing units (CPUs) (not shown), a supporting cache hierarchy including a level two (L2) cache (not shown), and a variety of other components and logic. The CPU(s) of processor complex 20 may include circuitry to execute instructions defined in an instruction set architecture. Specifically, one or more programs comprising the instructions may be executed by the CPU(s). Any instruction set architecture may be implemented in various embodiments. For example, in one embodiment, the ARM™ instruction set architecture (ISA) may be implemented. The ARM instruction set may include 16-bit (or Thumb) and 32-bit instructions. Other exemplary ISA's may include the PowerPC™ instruction set, the MIPS™ instruction set, the SPARC™ instruction set, the x86 instruction set (also referred to as IA-32), the IA-64 instruction set, etc.

In various embodiments, level 0 fabric mux 18 and level 1 fabric muxes 22A-N may constitute a communication fabric (or fabric) for providing a top-level interconnect for IC 10. In various embodiments, different types of traffic may flow independently through the fabric. The independent flow may be accomplished by allowing a single physical fabric bus to include a number of overlaying virtual channels, or dedicated source and destination buffers, each carrying a different type of traffic. Each channel may be independently flow controlled with no dependence between transactions in different channels. In other embodiments, the fabric shown in FIG. 1 may include one or more other units, two or more units may be combined into a single unit, and/or one or more units may be omitted. It is noted that the term "transaction" may be used to refer to a "memory transaction", "input/output (I/O) transaction", or other type of transaction. Generally speaking, a transaction may comprise a memory request, and the term "memory request" is not limited to requests that are ultimately responded to by memory, but can also include requests that are satisfied by a cache. It is also noted that the terms "memory request" and "transaction" may be used interchangeably throughout this disclosure.

As shown in FIG. 1, communication between many of the components of IC 10 may be facilitated by link interface units (LIUs) not shown. LIUs may be interspersed throughout the fabric and logic of IC 10 in various locations. LIUs are not shown in FIG. 1 to avoid obscuring the figure. Each LIU may provide a point-to-point communications link between two agents in IC 10. The LIU may provide buffering and may manage the credit-based flow control mechanism for subchannels of traffic between the various agents of IC 10. Additionally, multiple bridge units (bridges 32, 34, 36, and 38) may be interspersed through the fabric of IC 10, and the bridges may be utilized to facilitate communication between different domains within IC 10. For example, in one embodiment, each bridge may be configured to convert cache hints from a first protocol to a second protocol. It is noted there may be additional bridges within IC 10 which are not shown in FIG. 1 to avoid obscuring the figure.

In various embodiments, IC 10 may also include circuitry in the fabric to ensure coherence among different masters and other I/O devices. This circuitry may include cache coherency logic employing a cache coherency protocol to ensure data accessed by each master is kept up to date. An example of a cache coherency protocol includes the MOESI protocol with the Modified (M), Owned (O), Exclusive (E), Shared (S), and Invalid (I) states.

Masters 24-30 are representative of any number and type of components which may be coupled to the fabric of IC 10. For example, masters 24-30 may include one or more cameras, flash controllers, display controllers, media controllers, graphics units, video encoders, video decoders, and/or other devices. Masters 24-30 are also representative of any number of I/O interfaces or devices and may provide interfaces to any type of peripheral device implementing any hardware functionality included in the system. For example, any of the masters 24-30 may connect to audio peripherals such as microphones, speakers, interfaces to microphones and speakers, audio processors, digital signal processors, mixers, etc. Other I/O devices may include interface controllers for various interfaces external to IC 10, including interfaces such as Universal Serial Bus (USB), peripheral component interconnect (PCI) including PCI Express (PCIe), serial and parallel ports, general-purpose I/O (GPIO), a universal asynchronous receiver/transmitter (uART), a FireWire interface, an Ethernet interface, an analog-to-digital converter (ADC), a DAC, and so forth. Other I/O devices may also include networking peripherals such as media access controllers (MACs).

Memory controller 16 may include any number of memory ports and may include circuitry configured to interface to memory. For example, memory controller 16 may be configured to interface to dynamic random access memory (DRAM) such as synchronous DRAM (SDRAM) (including mobile versions of the SDRAMs such as mDDR3, etc., and/or low power versions of the SDRAMs such as LPDDR2, etc.), RAMBUS DRAM (RDRAM), double data rate (DDR) SDRAM, DDR2 SDRAM, Rambus DRAM (RDRAM), static RAM (SRAM), GDDR4 (Graphics Double Data Rate, version 4) SDRAM, GDDR5 (Graphics Double Data Rate, version 5) SDRAM, etc.

Memory controller 16 may also be coupled to memory physical interface circuits (PHYs) 12 and 14. Memory PHYs 12 and 14 are representative of any number of memory PHYs which may be coupled to memory controller 16. Memory PHYs 12 and 14 may be configured to interface to memory devices (not shown). Memory PHYs 12 and 14 may handle the low-level physical interface to the memory devices. For example, the memory PHYs 12 and 14 may be responsible for the timing of the signals, for proper clocking to synchronous DRAM memory, etc.

Memory controller 16 may include memory cache 17 for storing data retrieved from or intended for memory. Memory cache 17 may be configured to process memory requests from multiple requesting agents. One or more requesting agents may be included within any of the devices shown within IC 10. In one embodiment, cache lines may be allocated in memory cache 17 with either a sticky state or a non-sticky state. When deciding which data to retain in memory cache 17, memory cache 17 may base the decisions on the sticky status of the cache lines. Therefore, data with a high probability of being reused may be allocated in memory cache 17 as sticky to ensure that the corresponding cache lines are not replaced in memory cache 17 by other data. As a result of using the sticky allocation for data that is going to be reused, the number of accesses that are made to memory may be reduced, which reduces latency of memory requests and power consumption of IC 10. However, some of the requesting agents within IC 10 may not have the ability to indicate a sticky cache hint for a given transaction due to the limitations of the legacy protocol for specifying cache hints within their own domain. Therefore, in one embodiment, the bridge units may be configured to translate cache hints from a legacy protocol into cache hints specific to memory cache 17.

It is noted that other embodiments may include other combinations of components, including subsets or supersets of the components shown in FIG. 1 and/or other components. While one instance of a given component may be shown in FIG. 1, other embodiments may include two or more instances of the given component. Similarly, throughout this detailed description, two or more instances of a given component may be included even if only one is shown, and/or embodiments that include only one instance may be used even if multiple instances are shown. In addition, in other embodiments, the connections between components of IC 10 may differ from those shown in FIG. 1. For example, direct connections between components may be used for components that are not directly connected in FIG. 1, and components with direct connections in FIG. 1 may instead connect via one or more other components.

Figure 2:
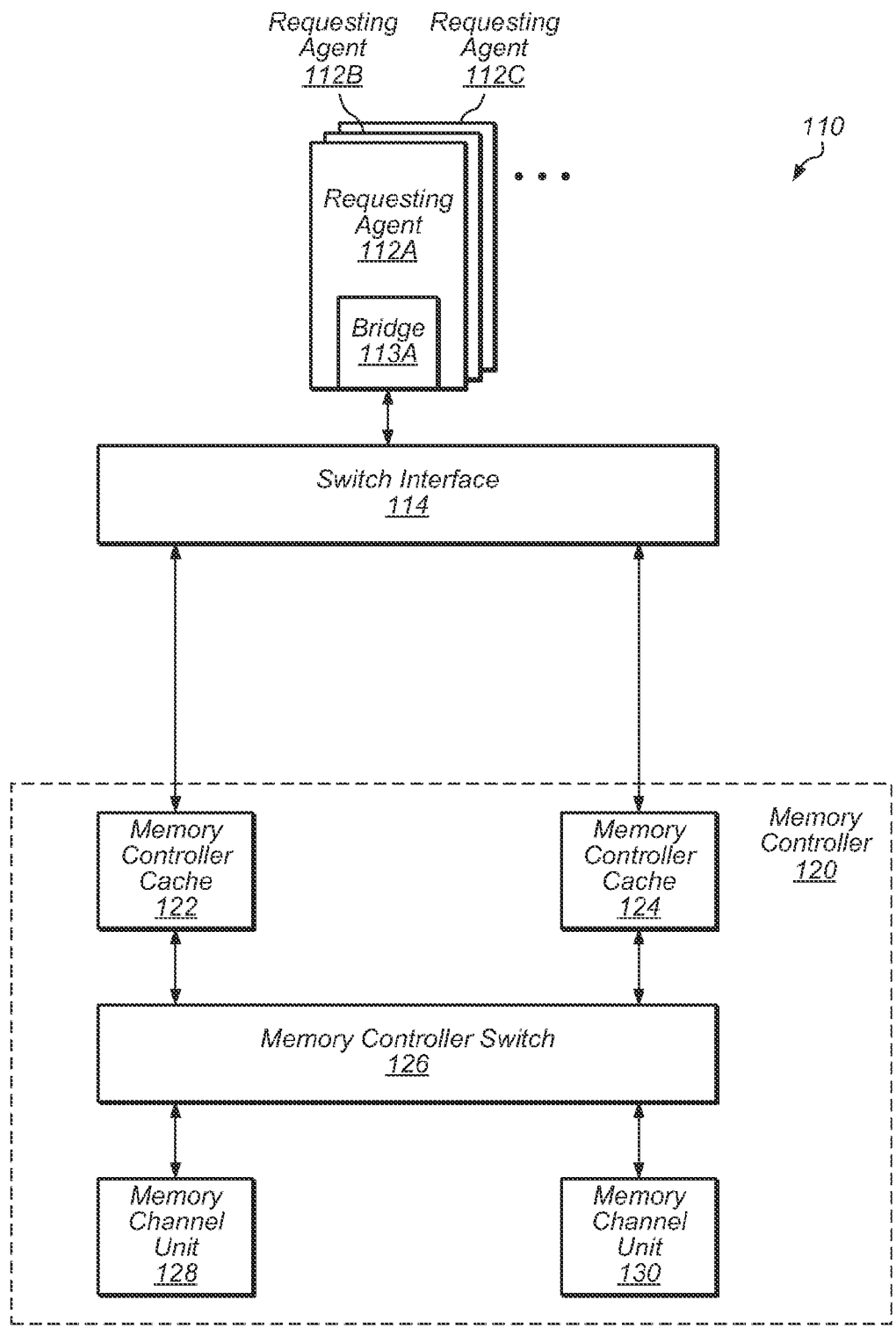
FIG. 2 is a block diagram that illustrates another embodiment of a portion of an IC.

Turning now to FIG. 2, another embodiment of a portion of an integrated circuit is shown. Integrated circuit (IC) 110 may include requesting agents 112A-C, switch interface 114, and memory controller 120. Memory controller 120 may include memory controller caches 122 and 124, memory channel switch 126, and memory channel units 128 and 130. Memory controller 120 may be coupled to one or more memory devices (not shown). In various embodiments, IC 110 may be included within any of various types of electronic devices, including mobile, battery-powered devices. IC 110 may also be referred to as a system on chip (SoC). It is noted that IC 110 may include other components and interfaces not shown in FIG. 2.

The requesting agents 112A-C may be configured to perform various operations in the system, and may access memory as part of performing these operations. For example, requesting agents 112 may be processors (either general purpose processors, or special purpose processors such as graphics processors). The processors may be configured to access memory to fetch instructions for execution, and may also be configured to access various data operands of the instructions in memory in response to executing the instructions. Other requesting agents may include fixed function circuitry (e.g., DMA controllers, peripheral interface controllers, graphics units). The requesting agents 112 may be physically separate circuitry, such as a separate instance of a processor. Alternatively, a requesting agent may be a logical entity such as a process or thread executing on a processor, such that a single physical processor may include multiple logical requestors. The number of requesting agents 112A-C included in a given embodiment may vary, from one to any number of requesting agents.

A given requesting agent (physical or logical) may be identified by a requesting agent identifier (ID). In various embodiments, the requesting agent may add a transaction identifier (TID) to track each individual request separately. Each request generated by a requesting agent 112A-C may be accompanied by a group ID. The group ID may also be referred to as dataset ID. The group ID may be a separate identifier from the requesting agent ID and the TID, and the number of bits used to represent the group ID value may vary depending on the embodiment. For example, in one embodiment, four bits may be used to represent the group ID value, and there may be 16 separate group IDs. The group ID may be assigned to a request based on the dataflow to which the request belongs. The OS or device driver, depending on the embodiment, may assign the group ID. For some types of dataflows, the same group ID may be shared by multiple requesting agent IDs. In one embodiment, requests to page translation tables may be considered part of the same dataflow, and any of these requests, regardless of the requesting agent ID, may be assigned to a common group ID. For other types of dataflows, a group ID may be utilized by only a single requesting agent.

Each requesting agent 112A-C may include a corresponding bridge 113A-C for converting from requesting agent's communication protocol to a second communication protocol utilized by memory controller 120. Each bridge 113 may also be configured to convert cache hints generated by the respective requesting agent into cache hints recognizable by memory caches 122 and 124. Although bridge 113A is shown as being located within requesting agent 112A, it is noted that bridge 113A may be located externally to requesting agent 112A in some embodiments.

Memory controller caches 122 and 124 may be separate physical caches but may be considered a single logical memory controller cache. More specifically, memory controller caches 122 and 124 may share a single address space, and memory requests that reference the address space of cache 122 may be routed by switch interface 114 to cache 122 and memory requests that reference the address space of cache 124 may be routed by switch interface 114 to cache 124. Switch interface 114 may be any type of communication medium (e.g. a bus, a point-to-point interconnect, etc.) and may implement any protocol. An interface may refer to the signal definitions and electrical properties of the interface, and the protocol may be the logical definition of communications on the interface (e.g., including commands, ordering rules, coherence support). It is noted that memory controller caches 122 and 124 may also be referred to as system caches, outer caches, or external caches. In other embodiments, memory controller 120 may include other numbers of memory controller caches. For example, in another embodiment, memory controller 120 may include four separate memory controller caches.

Memory controller caches 122 and 124 may be configured to maintain a sticky status for each cache line stored in the caches. The sticky status may be implemented via a sticky state, sticky flag, sticky bit, sticky tag, or other similar field. In one embodiment, a tag memory may be utilized to store tag entries that correspond to cache lines stored in a data memory. The tag entries may include multiple fields including a sticky status field and a group ID field to identify the dataflow source of the request which caused the cache line to be allocated in the cache.

Memory controller switch 126 may route traffic between memory controller caches 122 and 124 and memory channel units 128 and 130. There may be one memory channel unit 128 and 130 for each memory channel included in a given embodiment, and other embodiments may include one channel or more than two channels. The memory channel units 128 and 130 may be configured to schedule memory operations to be transmitted on the memory channel. The memory channel units 128 and 130 may be configured to queue read memory operations (or reads) and write memory operations (or writes) separately, and may be configured to arbitrate between reads and writes using a credit based system, for example. In the credit-based system, reads and writes may be allocated a certain number of credits.

In an embodiment, the memory channel units 128 and 130 may schedule memory operations in bursts of operations. To create bursts of memory operations for scheduling, the memory channel units 128 and 130 may group memory operations into affinity groups. A memory operation may be said to exhibit affinity with another memory operation if the operations may be performed efficiently on the memory interface when performed in close proximity in time.

It should be understood that the distribution of functionality illustrated in FIG. 2 is not the only possible architecture which may be utilized for an integrated circuit. Other integrated circuits may include other components, omit one or more of the components shown, and/or include a different arrangement of functionality among the components.

Referring now to FIG. 3, one embodiment of a cache hint translation table 140 is shown. Table 140 may be utilized to translate cache hints from a first domain into a second domain associated with a memory cache. Under the first cache hint encoding columns, there are four separate bits used to encode the cache hints that are compliant with the first protocol. In other embodiments, the first cache hint encoding may be represented by other numbers of bits besides four. The different possible values for these four bits are shown in table 140 and mapped to cache hint encodings compliant with the second protocol for read transactions and write transactions. The translated cache hint encodings shown in the far right columns are described in more detail in FIG. 4.

A bridge unit may utilize table 140 to map cache hint encodings from a first bus protocol domain into a second bus protocol domain (which includes sticky allocation hints) that is recognized by the memory cache. It is noted that table 140 may be reprogrammed via software to change the mappings stored in table 140. It is noted that table 140 may also be referred to as a map. It is also noted that in other embodiments, table 140 may include additional information and/or may be structured differently than is shown in FIG. 4. Also, the first cache hint encodings shown in table 140 may be mapped differently in other embodiments. For example, in another embodiment, only a subset of the four cache hint bits shown in table 140 may be utilized. This subset may include only bits 3 and 2. In other embodiments, other subsets of the first cache hint bits may be utilized within the first domain of the SoC.

Table 140 also includes a column to specify if the first encoding is generated by another processor. The other processor may be any other auxiliary processor which is separate from the cores in the processor core complex. The other processor in this case only generates six of the encodings defined within the first protocol. It is noted that this is for illustrative purposes only, and in other embodiments, the other processor(s) may be configured to generate any portion or the entirety of the encodings defined within the first protocol. It is also noted that the acronyms WT, WB, WA, and RA shown in table 140 stand for write-through, write-back, write-allocate, and read-allocate, respectively.

For the first four cache hint encodings shown in table 140 (encodings 0000 through 0011), each of these is mapped to a cache hint encoding of do not allocate for read and write transactions. The cache hint encoding value of "0101" is a reserved encoding within the first protocol. Therefore, this reserved encoding value may be mapped to the allocate sticky cache hint encoding for read transactions. This is one example of the use of a reserved encoding to convey information (not defined within the first protocol) to an outer cache. It is noted that the translations shown in table 140 may be utilized in one particular embodiment, and in other embodiments, other translations may be utilized.

The cache hint bits shown on the left side of table 140 may also be used to determine the ordering attribute of a given transaction. The device ordered attribute is one type of an ordering attribute which may be specified for a given transaction. For device ordered transactions, the order in which transactions are processed in relation to other transactions of the same flow may be maintained. Another ordering attribute is the relaxed order attribute, and if a transaction has the relaxed ordered attribute, then for this transaction the order in which it is processed in relation to other transactions of the same flow is unconstrained. In one embodiment, the first two entries in table 140 for cache hint bits "0000" and "0001" may be mapped to device ordered requests and the rest of the entries may be mapped to relaxed ordered requests. In other embodiments, other mappings of entries to device ordered and relaxed ordered requests may be utilized.

Turning now to FIG. 4, one embodiment of a cache hint table for a memory cache is shown. Cache hint table 150 is one example of a cache hint table for specifying the actual values that may be assigned to various memory cache hints. The values shown in table 150 depict cache hint values for the memory cache hints shown in the right-most columns within table 140 as shown in FIG. 3. Other embodiments may have other types of cache hints and/or may assign other values to the cache hints. In other embodiments, the values assigned to cache hints may have more than or fewer than three bits. For example, if there are only four or fewer cache hints, then two-bit values may be used.

In some embodiments, an original cache hint may be assigned to a request by the requesting agent that generates the request. The original cache hint may be defined according to a first protocol. A requesting agent may determine which original cache hint to use based on the type of data being referenced by the request. In some cases, the encodings available for assigning the original cache hint may not include encodings that are defined for a second cache hint protocol used by a memory subsystem, such as a memory cache within a memory controller. The cache hints shown in table 150 are representative of the second cache hint protocol after the translations of the original cache hints have been performed.

As shown in table 150, a cache hint of "no hint" may be assigned a value of "000". When a "no hint" value is received with a given request by a memory cache, the memory cache may determine how to process the given request based on the programming in a global configuration register. For example, in one embodiment, the configuration register may specify treating "no hint" requests as "allocate normal", and so the memory cache may process the given request as if the request included an "allocate normal" cache hint. Also, the group ID of the request may be ignored for "no hint" requests and the group ID may be set to all 0's. In other embodiments, the memory cache may choose alternate methods for responding to "no hint" requests.

A cache hint of "allocate normal" may be specified with a value of "001" in the cache hint field of the request. For "allocate normal" requests, cache lines may be allocated in the memory cache and may be replaced by other lines using a LRU scheme. An "allocate normal" request may replace other non-sticky lines. However, if there are no available non-sticky cache line candidates in the memory cache, then the request may not allocate in the memory cache.

A cache hint of "allocate sticky" for a request may be specified with a value of "010" in the cache hint field of the request. For "allocate sticky" requests, cache lines may be allocated in the cache as sticky and may be optionally replaced only by other "allocate sticky" requests of the same group ID. A cache hint of "do not allocate" for a request may be specified with a value of "011". For "do not allocate" requests, cache lines may not be allocated in the cache. If a "do not allocate" request hits in the cache, then the hit cache line may be left in the cache and may maintain its current state.

A cache hint of "de-allocate", or "set LRU", for a request may be specified with a value of "100" in the cache hint field of the request. For "de-allocate" requests, cache lines may not be allocated in the memory cache. If a "de-allocate" request hits in the memory cache, then the state of the hit cache line may be updated to "LRU dirty". Then, the memory cache may replace this cache line at some future point when a subsequent request misses in the memory cache.

If a "de-allocate" request is a read hit, then the local copy may be invalidated if it is clean or the local copy may be marked as a prime candidate for replacement (e.g., LRU dirty) if it is dirty. If the cache line is dirty and the request is a coherent read request then the ownership of the dirty data may be transferred to the requesting agent and the memory cache may invalidate the local copy. The other cache hint values (101, 110, and 111) may be reserved for other types of hints. For example, in other embodiments, other hints (e.g., "drop") may be defined and used by the memory cache.

Figure 5:
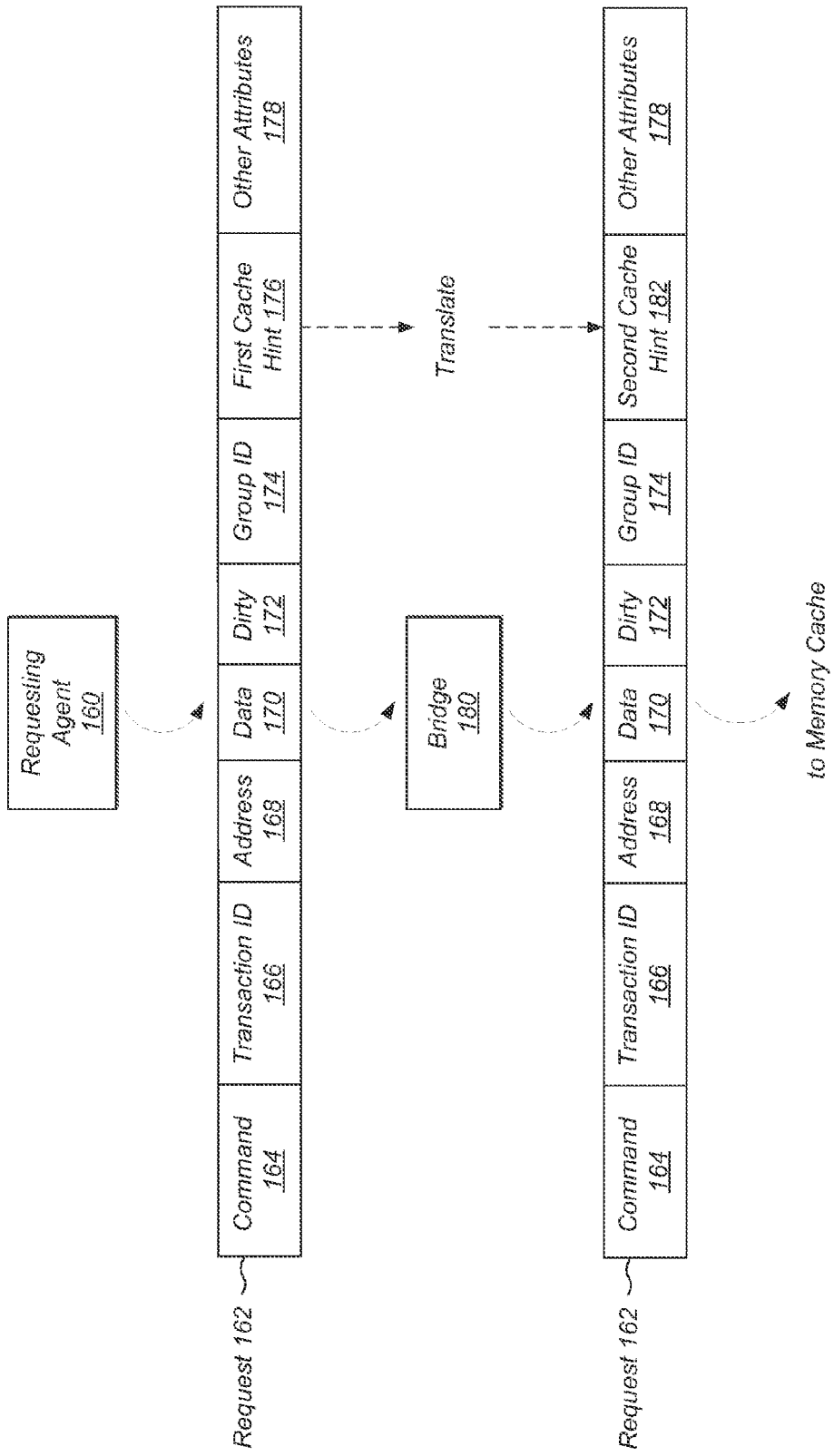
FIG. 5 is a block diagram of one embodiment of a requesting agent conveying a request to a memory cache via a bridge.

Referring now to FIG. 5, a block diagram of one embodiment of a requesting agent conveying a request to a memory cache via a bridge is shown. Requesting agent 160 is representative of any number and type of requesting agents. Although requesting agent 160 is shown as sending request 162 directly to bridge 180, it is noted that one or more components may be located between requesting agent 160 and bridge 180.

Each request sent from requesting agent 160 may include a plurality of fields. For example, in one embodiment, request 162 may include command 164, which indicates the type of request (e.g., read, write) being sent. Request 162 may also include transaction ID 166, which indicates the transaction ID associated with request 162. Transaction ID 166 may uniquely identify the request for requesting agent 160. It is noted that transaction ID 166 may also be referred to as a "request ID". In addition, in other embodiments, request 162 may also include an agent ID to identify the requesting agent. Request 162 may also include the address 168 and data 170 fields to identify the memory address and data (for a write request), respectively.

Request 162 may also include a dirty status indicator 172 to indicate if the write data is dirty. Request 162 may also include a group ID 174 to identify the group ID of request 162. Cache hint 176 may determine how request 162 is treated by memory caches 122 and/or 124. Other attributes 178 are representative of any number and type of additional attributes (e.g., coherency, QoS, size of the request, requestor ID) which may be part of request 162. As shown in FIG. 5, bridge 180 may translate first cache hint 176 into a second cache hint 182. First cache hint 176 may be compliant with a first protocol, and second cache hint 182 may be compliant with a second protocol. It is noted that the bridge may also translate any of the other fields as desired, as well as add or remove fields depending on whether such fields are required on the second bus protocol but not on the first protocol, vice versa, or for any other reason.

Turning now to FIG. 6, one embodiment of a table for mapping cache hints and other attributes from a first protocol to cache hints of a second protocol is shown. Table 190 may be utilized by a bridge or other logical unit for mapping transactions to cache hints utilized by a cache external (e.g., memory cache) to the original requesting agent that generated the original transaction. In one embodiment, table 190 may be utilized to implement an override function within the bridge or other logical unit. The override functionality may be configured to override the original cache hint value as generated by the requesting agent for a given transaction.

Each entry of table 190 may include first cache hint encoding values. In one embodiment, the first cache hint encoding value may be utilized to perform the mapping to the secondary cache hint value for the external cache. In other embodiments, other attributes (e.g., request ID, dataset ID, requesting agent ID, address range, read/write transaction) associated with a given transaction may be utilized to perform the mapping to the secondary cache hint value for the external cache. For example, in one embodiment, all read transactions for a given requesting agent may be mapped to a specific second cache hint encoding regardless of the first cache hint encoding value. Alternatively, in another embodiment, all transactions with a given request ID may be mapped to a specific second cache hint encoding. In these embodiments, the specific attribute(s) of a given transaction may take precedence over the first cache hint encoding value of the given transaction in determining which second cache hint encoding to utilize. In a further embodiment, a combination of the first cache hint encoding value and one or more attributes may be utilized to determine the second cache hint encoding value that is utilized. For example, in one embodiment, if the requesting agent ID is a two-bit field, this field may be concatenated with the first cache hint encoding value to create a six-bit value, and there may be a total of 64 entries for this six-bit value in table 190. Each of these 64 entries may be mapped separately to second cache hint encoding values for read and write transactions. Alternative embodiments using other combinations of attributes or subsets of attributes (with or without the first cache hint encoding value) are possible and are contemplated. It is shown in table 190 that the last four entries are reserved cache hint encodings. These reserved encodings may be utilized by a requesting agent or other logical unit for setting the original cache hint to a value that will be mapped to any desired secondary cache hint value for the external cache. It is noted that this example with the last four entries being defined as reserved is for illustrative purposes only, and that in other embodiments, other numbers of entries may be reserved by the specific protocol used for the original cache hint encodings. The reserved encodings may also be randomly dispersed throughout table 190 in other embodiments, rather than being a block of contiguous entries within table 190 as shown in FIG. 6.

The values shown for the read and write transactions in the second cache hint encoding columns are represented by an "X". This is shown to represent that any values may be programmed in these columns depending on the desired mappings. These values may be reprogrammed by software at any time during the operation of the SoC. Table 190 is representative of any size of table, with the capacity for storing any number of entries corresponding to input cache hint encodings. In one embodiment, table 190 may store 16 entries, while in other embodiments, table 190 may include other numbers of entries.

Figure 7:
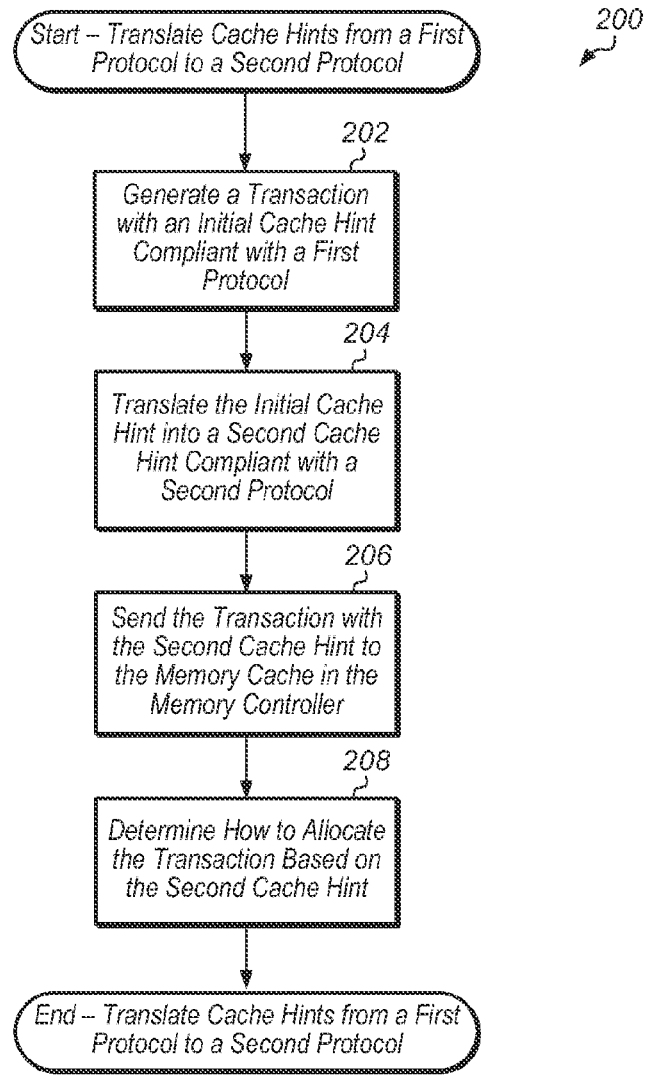
FIG. 7 is a generalized flow diagram illustrating one embodiment of a method for translating cache hints.

Referring now to FIG. 7, one embodiment of a method 200 for translating cache hints from a first protocol to a second protocol is shown. For purposes of discussion, the steps in this embodiment are shown in sequential order. It should be noted that in various embodiments of the method described below, one or more of the elements described may be performed concurrently, in a different order than shown, or may be omitted entirely. Other additional elements may also be performed as desired.

In one embodiment, a requesting agent may generate a transaction with an initial cache hint encoding (block 202). The requesting agent may be any of a variety of requesting agents (e.g., a graphics unit, a video encoder, a video decoder, an auxiliary processor). The original cache hint encoding may be compliant with a first protocol. In one embodiment, the original cache hint encoding may use an encoding value that is a reserved encoding as defined by the first protocol.

Next, the original cache hint encoding may be translated into a second cache hint encoding that is compliant with a second protocol (block 204). The second protocol may be any of a various types of protocols (e.g., industry-standards, proprietary, SoC specific) depending on the embodiment, and the second protocol may be recognized by a cache external to the requesting agent. The translation may be generated by any of a variety of logical units, such as a unit integrated with the requesting agent, a unit external to the requesting agent, a bridge unit, etc. Also, in some embodiments, a table or map may store a mapping of encodings from the first protocol to the second protocol, and the table may be used to perform the translation from the original cache hint encoding to the second cache hint encoding. Alternatively, in another embodiment, a page table entry may be accessed for the transaction, and the page table entry may store a cache hint encoding based on one or more attributes (e.g., address range, requestor ID, dataset ID, read or write) associated with the transaction. In this embodiment, the second cache hint encoding may be retrieved from the corresponding page table entry or the second cache hint encoding may be derived from a value stored in the page table entry and used to replace the original cache hint encoding.

Next, the transaction with the second cache hint encoding may be sent to the memory cache in the memory controller (block 206). A lookup of the memory cache may be performed for the transaction, and the action that is taken as a result of the lookup may be based on the second cache hint encoding (block 208). The memory cache may be configured to recognize cache hints that are compliant with the second protocol. It is noted that method 200 may be performed in parallel for any number of transactions that are generated by any number of requesting agents.

Figure 8:
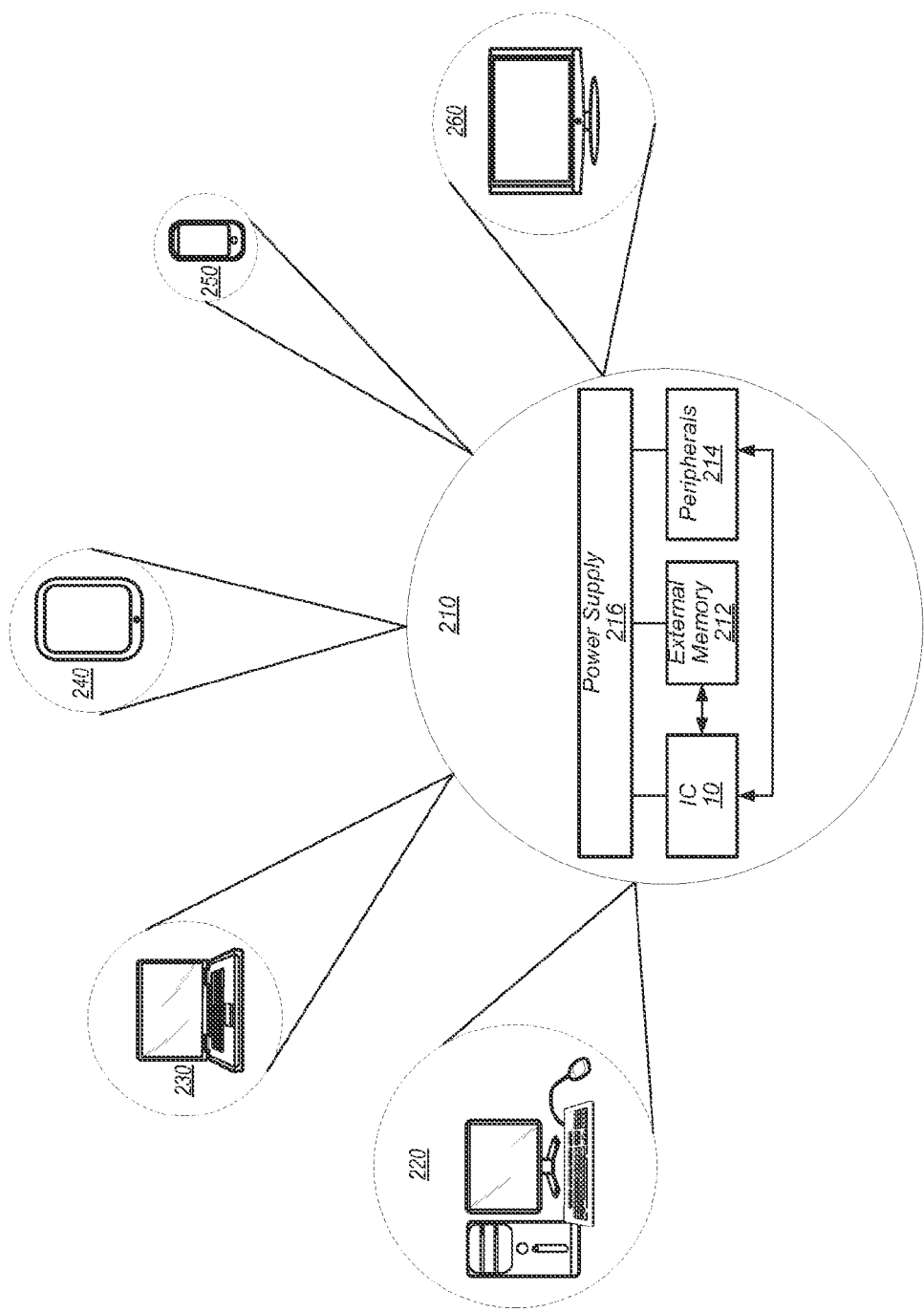
FIG. 8 is a block diagram of one embodiment of a system.

Turning now to FIG. 8, a block diagram of one embodiment of a system 210 is shown. As shown, system 210 may represent chip, circuitry, components, etc., of a desktop computer 220, laptop computer 230, tablet computer 240, cell phone 250, television 260 (or set top box configured to be coupled to a television), or otherwise. In the illustrated embodiment, the system 210 includes at least one instance of IC 10 (of FIG. 1) coupled to an external memory 212.

IC 10 is coupled to one or more peripherals 214 and the external memory 212. A power supply 216 is also provided which supplies the supply voltages to IC 10 as well as one or more supply voltages to the memory 212 and/or the peripherals 214. In various embodiments, power supply 216 may represent a battery (e.g., a rechargeable battery in a smart phone, laptop or tablet computer). In some embodiments, more than one instance of IC 10 may be included (and more than one external memory 212 may be included as well).

The memory 212 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc. Alternatively, the devices may be mounted with IC 10 in a chip-on-chip configuration, a package-on-package configuration, or a multi-chip module configuration.

The peripherals 214 may include any desired circuitry, depending on the type of system 210. For example, in one embodiment, peripherals 214 may include devices for various types of wireless communication, such as wifi, Bluetooth, cellular, global positioning system, etc. The peripherals 214 may also include additional storage, including RAM storage, solid state storage, or disk storage. The peripherals 214 may include user interface devices such as a display screen, including touch display screens or multitouch display screens, keyboard or other input devices, microphones, speakers, etc.

Figure 9:
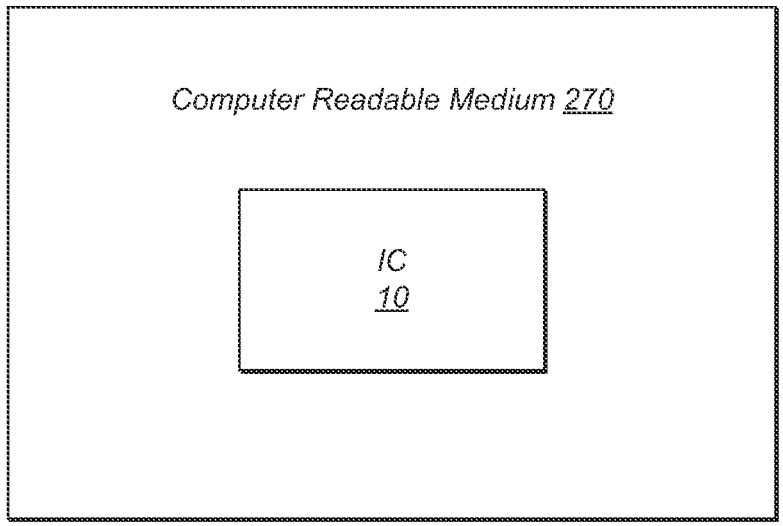
FIG. 9 is a block diagram of one embodiment of a computer readable medium.

Referring now to FIG. 9, one embodiment of a block diagram of a computer readable medium 270 including one or more data structures representative of the circuitry included in IC 10 (of FIG. 1) is shown. Generally speaking, computer readable medium 270 may include any non-transitory storage media such as magnetic or optical media, e.g., disk, CD-ROM, or DVD-ROM, volatile or non-volatile memory media such as RAM (e.g. SDRAM, RDRAM, SRAM, etc.), ROM, etc., as well as media accessible via transmission media or signals such as electrical, electromagnetic, or digital signals, conveyed via a communication medium such as a network and/or a wireless link.

Generally, the data structure(s) of the circuitry on the computer readable medium 270 may be read by a program and used, directly or indirectly, to fabricate the hardware comprising the circuitry. For example, the data structure(s) may include one or more behavioral-level descriptions or register-transfer level (RTL) descriptions of the hardware functionality in a high level design language (HDL) such as Verilog or VHDL. The description(s) may be read by a synthesis tool which may synthesize the description to produce one or more netlists comprising lists of gates from a synthesis library. The netlist(s) comprise a set of gates which also represent the functionality of the hardware comprising the circuitry. The netlist(s) may then be placed and routed to produce one or more data sets describing geometric shapes to be applied to masks. The masks may then be used in various semiconductor fabrication steps to produce a semiconductor circuit or circuits corresponding to the circuitry. Alternatively, the data structure(s) on computer readable medium 270 may be the netlist(s) (with or without the synthesis library) or the data set(s), as desired. In yet another alternative, the data structures may comprise the output of a schematic program, or netlist(s) or data set(s) derived therefrom. While computer readable medium 270 includes a representation of IC 10, other embodiments may include a representation of any portion or combination of portions of IC 10 (e.g., bridge 32).

It should be emphasized that the above-described embodiments are only non-limiting examples of implementations. Numerous variations and modifications will become apparent to those skilled in the art once the above disclosure is fully appreciated. It is intended that the following claims be interpreted to embrace all such variations and modifications.

What is claimed is:

1. A method comprising:
 a requesting agent generating a transaction including a plurality of fields, said fields including a cache hint field storing a first cache hint that indicates how data corresponding to the transaction is to be cached, wherein the first cache hint is compliant with a first protocol that is not compatible with a memory subsystem to which the transaction is targeted such that the memory subsystem is not configured to recognize or properly act upon the first cache hint;
 the requesting agent conveying the transaction with the first cache hint to the memory subsystem;
 receiving the transaction with the first cache hint at a bridge unit prior to the transaction reaching the memory subsystem, wherein the bridge unit is interposed between the requesting agent and the memory subsystem;
 the bridge unit accessing a table to translate the first cache hint to a second cache hint, wherein the second cache hint is compliant with a second protocol that is compatible with the memory subsystem and is different from the first protocol;
 the bridge unit modifying the transaction with the first cache hint by replacing the first cache hint in the transaction with the second cache hint;
 the bridge unit conveying via a switch interface the transaction with the second cache hint to the memory subsystem;
 receiving the transaction with the second cache hint at the memory subsystem;
 the memory subsystem determining how to allocate data corresponding to the transaction in a cache of the memory subsystem based on the second cache hint; and
 programming an override function in the bridge unit to translate the first cache hint to a third cache hint different from the second cache hint.

2. The method as recited in claim 1, wherein the table comprises a map that includes a plurality of entries, each of the plurality of entries including at least a first encoding of a given cache hint and a second encoding of the given cache hint, wherein each of the first encoding and the second encoding indicates how data of the transaction is to be cached.

3. The method as recited in claim 1, wherein the transaction is in a first format, wherein the first format is compliant with the first protocol, the method further comprising converting the transaction into a second format, wherein the second format is compliant with the second protocol.

4. The method as recited in claim 1, wherein the second cache hint is an allocate sticky cache hint.

5. The method as recited in claim 1, wherein the second cache hint is a de-allocate cache hint.

6. A bridge unit comprising:
 a first interface configured to receive a transaction including a plurality of fields, said fields including a cache hint field storing a first cache hint, wherein the first cache hint indicates how data corresponding to the transaction is to be cached and is compliant with a first protocol that is not compatible with a memory subsystem to which the transaction is targeted such that the memory subsystem is not configured to recognize or properly act upon the first cache hint, wherein the first interface receives the transaction prior to the transaction reaching a memory subsystem, wherein the bridge unit is configured to be interposed between the requesting agent and the memory subsystem;

logic configured to:
access a table to translate the first cache hint to a second cache hint, wherein the second cache hint is compliant with a second protocol that is compatible with the memory subsystem, wherein the second protocol is different than the first protocol; and
modify the transaction with the first cache hint by replacing the first cache hint in the transaction with the second cache hint; and a second interface configured to convey via a switch interface the transaction with the second cache hint to the memory subsystem;

wherein said logic comprises a programmable override function to translate the first cache hint to a third cache hint different from the second cache hint.

7. The bridge unit as recited in claim 6, wherein the transaction is received from the first requesting agent.

8. The bridge unit as recited in claim 7, wherein the second cache hint is an allocate sticky cache hint.

9. The bridge unit as recited in claim 7, wherein the second cache hint is a de-allocate cache hint.

10. The bridge unit as recited in claim 7, wherein the second cache hint has a different encoding than the first cache hint.

11. The bridge unit as recited in claim 10, wherein the second cache hint uses a different number of bits than the first cache hint.

12. The bridge unit as recited in claim 7, wherein the transaction includes a transaction identifier (ID), and wherein the translation of the first cache hint to the second cache hint is also based on the transaction ID of the transaction.

13. A system on chip (SoC) comprising:
a first bus master configured to convey a transaction including a plurality of fields, said fields including a cache hint field storing a first cache hint, wherein the first cache hint indicates how data corresponding to the transaction is to be cached, wherein the first bus master communicates on a bus according to a first protocol that is not compatible with a memory subsystem to which the transaction is targeted such that the memory subsystem is not configured to recognize or properly act upon the first cache hint;
a memory subsystem, wherein the memory subsystem communicates using a second protocol different from the first protocol;
a switch interface configured to transfer transactions; and
a first bridge unit coupled to the first bus master and coupled through the switch interface to the memory subsystem, wherein the first bridge unit is configured to:
receive the transaction with the first cache hint from the first bus master unit prior to the transaction reaching the memory subsystem, wherein the bridge unit is interposed between the requesting agent and the memory subsystem;
access a table to translate the first cache hint to a second cache hint, wherein the second cache hint is compliant with the second protocol;
modify the transaction with the first cache hint by replacing the first cache hint in the transaction with the second cache hint; and
convey via the switch interface the transaction with the second cache hint to the memory subsystem;
wherein said first bridge unit comprises a programmable override function to translate the first cache hint to a third cache hint different from the second cache hint;
wherein the memory subsystem is configured to:
receive the transaction with the second cache hint; and
determine how to allocate data corresponding to the transaction in a cache based on the second cache hint.

14. The SoC as recited in claim 13, wherein the memory cache is configured to utilize the second cache hint for determining an action to take regarding data of the transaction.

15. The SoC as recited in claim 14, wherein the first bus master is associated with a first requesting agent identifier (ID), and wherein the translation of the first cache hint to the second cache hint is also based on the first requesting agent ID.

16. The SoC as recited in claim 14, wherein the table comprises a map for translating cache hints that are compliant with the first protocol to cache hints that are compliant with the second protocol, and wherein the map is programmable.

17. The SoC as recited in claim 13, further comprising:
a second bus master; and
a second bridge unit, wherein the second bridge unit is configured to translate a third cache hint into a fourth cache hint, wherein the third cache hint is associated with a second transaction generated by the second bus master, wherein the third cache hint is compliant with a third protocol different from both the first protocol and the second protocol, and wherein the fourth cache hint is compliant with the second protocol.

* * * * *